July 20, 1926.
E. L. DELANY ET AL
1,593,546
TOILET SEAT AND METHOD OF MAKING SAME
Filed March 6, 1925   2 Sheets-Sheet 1
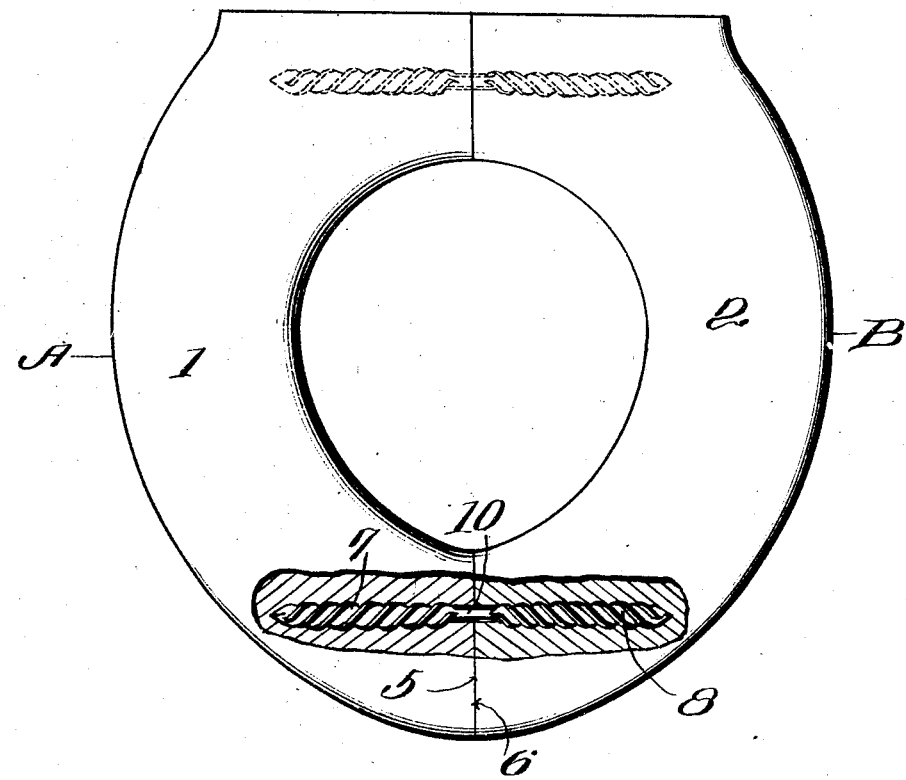
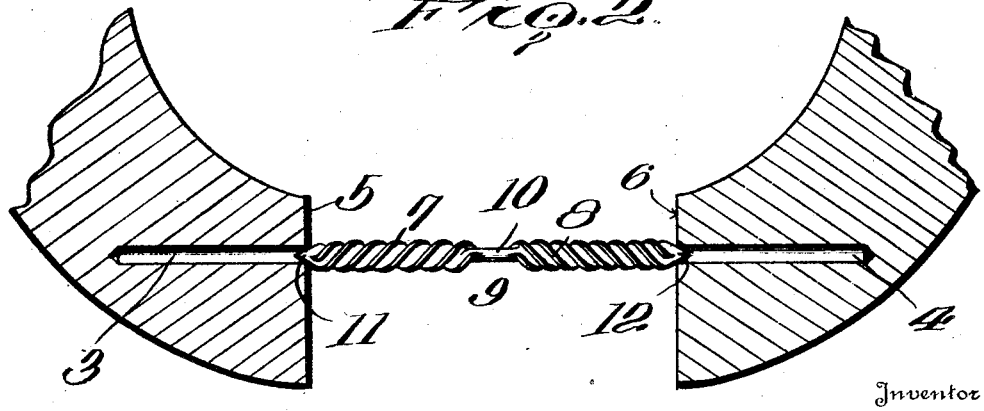
Inventor
E. L. Delany.
P. P. Charles
By C. R. Wright, Jr. Attorney

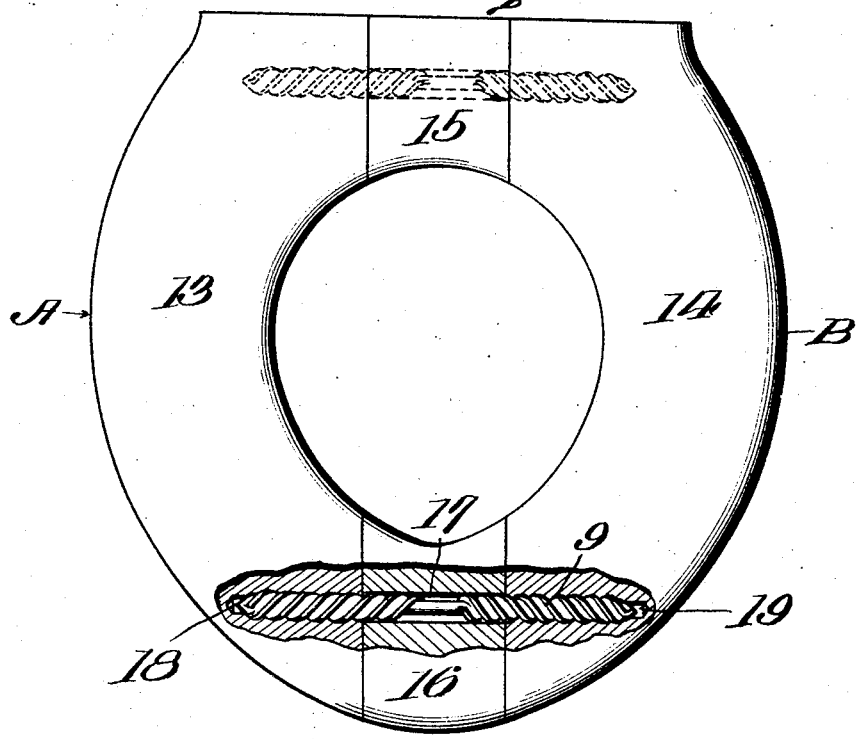
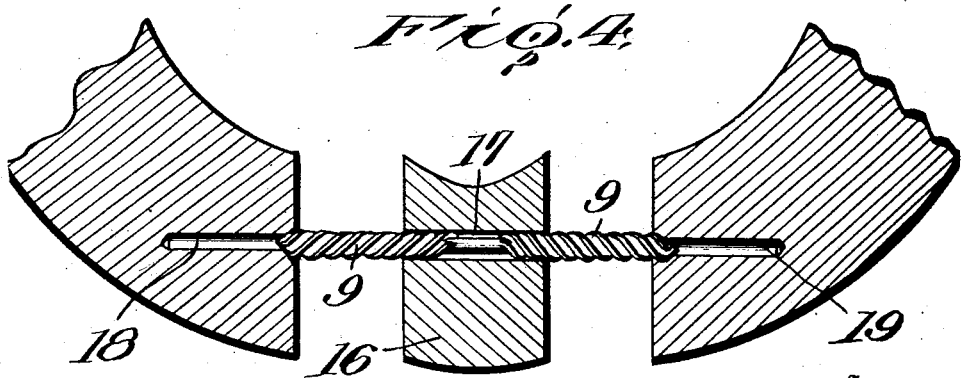

Patented July 20, 1926.

1,593,546

UNITED STATES PATENT OFFICE.

EDWARD L. DELANY, OF BROOKLYN, NEW YORK, AND RICHARD PAUL CHARLES, OF BRISTOL, VIRGINIA, ASSIGNORS, BY DIRECT AND MESNE ASSIGNMENTS, TO DELANY REALTY CORPORATION, OF BROOKLYN, NEW YORK.

TOILET SEAT AND METHOD OF MAKING SAME.

Application filed March 6, 1925. Serial No. 13,620.

Our invention relates to improvements in toilet seats and method of making same.

The object of our invention is to provide an improved toilet seat and method of making the same, whereby it is made up of two sections and firmly secured together so that the securing means are wholly out of sight, and the joint between the two sections made so perfect that it has the appearance of a one piece seat, and thus produce a seat in which there is no visible connecting means between the two sections.

Another object of our invention is to provide a simple, cheap and effective toilet seat and method of making the same, whereby considerable time, labor and expense is saved in the manufacture thereof.

In the accompanying drawings:—

Figure 1 is a top plan view of my improved seat constructed and assembled under the improved method.

Figure 2 is an enlarged plan view of one end of the two sections showing the first step of the method of assembling the seat.

Figure 3 is a top plan view of another form of seat constructed under my improved method.

Figure 4 shows the first step of the method of constructing the form of seat shown in Figure 3.

Referring now to the drawings, 1 represents one section of the seat, and 2 the other section, which in the ordinary construction of two piece seats are usually secured together with dowel pins or by screw members entering the two members and operated by a wrench, whereby the two sections are drawn together. This last mentioned means necessitates the cutting away of the lower faces of the two members at the point between the sections to receive a wrench, whereby the screws are tightened to draw the two sections together, thus consuming considerable time and labor in screwing up the screws and filling the openings.

In our improved seat and method of making the same, the two sections, at each end, have openings 3 and 4, drilled in the abutting faces 5 and 6, directly opposite each other and which are of a diameter slightly less than the threaded portions 7 and 8 of the connecting member 9. The connecting member 9 intermediate the threaded portions 7 and 8 could be left blank as indicated at 10, and is of a diameter slightly less than that of the drilled openings 3 and 4.

The threaded portions 7 and 8 are arranged with a right and left hand thread, and each threaded portion as shown, has four threads which form greater holding surface for the securing member, and owing to the series of threads, the same is readily forced into the openings and the pressure causes the same to rotate and draw the two sections together. While we have described four threads it will be understood that at least two threads must be employed, but preferably more.

In assembling the two sections 1 and 2 it will be seen that the right and left threaded members 7 and 8 are placed with the points 11 and 12 entering the openings 3 and 4, one at each end of the sections of the seat, and thus the two sections are spaced a considerable distance apart, as shown in Figure 2 of the drawings. Pressure is then applied to the sections 1 and 2 at the points A and B which cause the two sections to move towards each other, and in this movement the connecting member 9, owing to the series of threads in the right and left hand threaded portions, is caused to rotate and travel inwardly within the openings 3 and 4 and tightly draw the two sections together as shown in the Figure 1 of the drawings. In constructing said seat the abutting faces 5 and 6 could be coated with glue or cement, and the pressure being maintained at the points A and B, the two sections would be tightly glued together and held together by members 9.

In the modifications shown in Figures 3 and 4 we have made the seat in four pieces instead of two. In this form the two sections of the seat 13 and 14 are made of a less width than that shown in Figures 1 and 2, and a small piece 15 is inserted at the rear of the seat, and a small piece 16 at the forward end of the seat. These pieces 15 and 16 have openings 17 bored therethrough and which are of a diameter equal to the diameter of the threads of the connecting member 9, this allows of the free rotation of the threaded member in the small pieces when pressure is applied at the points A and B on the sections 13 and 14. The threaded member 9 will be caused to rotate in the openings 18 and 19, in the sections 13 and 14, the same as that described in respect to sections 1 and 2, and draw the two sections 13 and 14 towards each other, firmly clamping the two pieces 15 and 16 between the sections 13 and 14, and thus form a seat having a perfectly smooth upper and lower face, the threaded member holding the sections 15 and 16 against transverse movement.

Having thus fully described our invention what we claim is:—

1. A method of making a toilet seat consisting in placing right and left hand threaded members having right and left hand wood threaded portions between the sections of the seat and forcing the sections together causing the threaded members to rotate by pressure only, and enter the sections and hold the same together.

2. A method of making a toilet seat consisting in placing members having right and left hand wood threaded portions between the sections and forcing the sections together, causing the threaded members to rotate by pressure only and enter the sections and hold the same together requiring the same force to separate the sections.

3. A method of making a toilet seat consisting in placing members having right and left hand wood threaded portions separated by a smooth reduced portion between sections and forcing the sections together, thus causing the threaded members to rotate by pressure only and enter the sections and rotate until the sections of the seat abut.

4. A method of making toilet seats consisting in placing members between the two sections of the seat, said members having right and left hand wood threaded portions separated by a reduced smooth portion and forcing the two sections together thus causing the threaded members to rotate by pressure only, and enter the sections for holding the same together, requiring the same force to separate the sections.

In testimony whereof we affix our signatures.

EDWARD L. DELANY.
R. PAUL CHARLES.